United States Patent
Jiang et al.

(10) Patent No.: US 9,121,343 B2
(45) Date of Patent: Sep. 1, 2015

(54) CONNECTING ROD OF INTERNAL COMBUSTION ENGINE

(71) Applicant: Dongfeng Commercial Vehicle Co., Ltd., Shiyan (CN)

(72) Inventors: Ming Jiang, Wuhan (CN); Hongji Su, Wuhan (CN); Xiaoxun Chen, Wuhan (CN); Weiguo Li, Wuhan (CN); Hongliang Wu, Wuhan (CN)

(73) Assignee: Dongfeng Commercial Vehicle Co., Ltd., Shiyan (CN)

( * ) Notice: Subject to any disclaimer, the term of this patent is extended or adjusted under 35 U.S.C. 154(b) by 0 days.

(21) Appl. No.: 14/148,679

(22) Filed: Jan. 6, 2014

(65) Prior Publication Data

US 2014/0116373 A1    May 1, 2014

Related U.S. Application Data

(63) Continuation-in-part of application No. PCT/CN2012/080791, filed on Aug. 30, 2012.

(30) Foreign Application Priority Data

Jul. 16, 2012 (CN) .......................... 2012 1 0246057

(51) Int. Cl.
| | | |
|---|---|---|
| *F02B 75/32* | (2006.01) | |
| *F02B 75/04* | (2006.01) | |
| *F16C 9/00* | (2006.01) | |
| *F16C 9/04* | (2006.01) | |
| *F16C 33/10* | (2006.01) | |

(52) U.S. Cl.
CPC . *F02B 75/04* (2013.01); *F16C 9/00* (2013.01); *F16C 9/04* (2013.01); *F16C 33/1065* (2013.01)

(58) Field of Classification Search
CPC ................. F16C 9/04; F16C 7/02; F16J 7/00; F16J 1/14; F01M 2001/066
USPC ....................... 123/197.3, 197.4; 92/187, 220; 74/579 R, 579 E, 593; 29/888.09–888.092
See application file for complete search history.

(56) References Cited

U.S. PATENT DOCUMENTS

| | | | | |
|---|---|---|---|---|
| 7,500,417 | B2 * | 3/2009 | Ogawa et al. ............... | 74/579 E |
| 7,516,546 | B2 * | 4/2009 | McEwan .................... | 29/888.09 |
| 7,527,026 | B1 * | 5/2009 | Berger ........................ | 123/48 B |
| 7,581,315 | B2 * | 9/2009 | McEwan .................... | 29/888.09 |
| 7,810,411 | B2 * | 10/2010 | McEwan .................... | 74/579 R |
| 8,079,145 | B2 * | 12/2011 | McEwan .................... | 29/888.09 |
| 2004/0134306 | A1 * | 7/2004 | Liu .............................. | 74/579 R |
| 2004/0159180 | A1 * | 8/2004 | Ogawa et al. ................. | 74/593 |

(Continued)

*Primary Examiner* — Lindsay Low
*Assistant Examiner* — Long T Tran
(74) *Attorney, Agent, or Firm* — Matthias Scholl P.C.; Matthias Scholl

(57) ABSTRACT

A connecting rod of an internal combustion engine, including a small end and a shank. The small end employs a flexible structure made of hard material. The hard material is a steel or alloy material having a tensile strength greater than or equal to 700 megapascal. The small end of the flexible structure includes a circular body, a center hole, and a flexible support. The circular body encircles the center hole, and the center hole is a complete circular hole having a constant diameter. The small end matches with a piston pin. The flexible structure of the small end operates to allow an elastic deformation of the center hole along an axial direction thereof produced by cylinder pressure exerted on the piston pin to adapt to a bending deformation of the piston pin along the axial direction.

11 Claims, 6 Drawing Sheets

(56) References Cited

U.S. PATENT DOCUMENTS

| | | | |
|---|---|---|---|
| 2010/0143180 A1* | 6/2010 | Kubota et al. | 420/84 |
| 2011/0120261 A1* | 5/2011 | Abreu et al. | 74/579 R |
| 2013/0092119 A1* | 4/2013 | Lapp et al. | 123/197.3 |
| 2013/0276741 A1* | 10/2013 | Pauls | 123/193.6 |

* cited by examiner

CONNECTING ROD OF INTERNAL COMBUSTION ENGINE

CROSS-REFERENCE TO RELATED APPLICATIONS

This application is a continuation-in-part of International Patent Application No. PCT/CN2012/080791 with an international filing date of Aug. 30, 2012, designating the United States, now pending, and further claims priority benefits to Chinese Patent Application No. 201210246057.0 filed Jul. 16, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a connecting rod of a reciprocating internal combustion engine, and more particularly to a bushing-free connecting rod of an internal combustion engine comprising a flexible structure made of hard material.

2. Description of the Related Art

A connecting rod of an internal combustion engine operates to connect a piston to a crankshaft for transmitting the driving force and movement therebetween. A small end of the connecting rod is connected to the piston via a piston pin, and a big end of the connecting rod is connected to a rod journal of the crankshaft, so that the explosion pressure bear by the piston is transmitted to the crankshaft, and the reciprocating motion of the piston induces the rotary motion of the crankshaft. During the above process, alternating loads including compression, stretching, and bending are imposed on the connecting rod. For a floating piston pin, when the connecting rod works, relative motion will occur between the small end of the connecting rod and the piston rod thereby resulting in abrasion on the small end and the piston pin under the action of the alternating load. The abrasion enlarges the gap between the small end and the piston pin, which leads to abnormal sound of the piston pin, damages on the small end and the piston pin, or even hits on the cylinder. In order to weaken the abrasion between the small end and the piston rod, a wear reducing bimetal bushing is pressed in the small end as a sliding bearing. Oil grooves are milled or oil holes are bored on the bimetal bushing and the small end for collecting the spattered lubricant oil for lubrication during the running of the engine.

As the explosion pressure of the commercial vehicle engine increases, the surface pressure imposed on the bushing of the small end becomes larger and larger, and it is much difficult to select the material for the bearing and to develop engines having high explosion pressure, thereby increasing the production cost.

Upon using sliding bearing in prior art, the base for mounting the sliding bearing adopts an intensified rigid structure for the purpose of providing a reliable interference fit when mounting the sliding bearing. It is the same in the reciprocating internal combustion engine that a sliding bushing is pressed in a center hole having a high rigidity, as shown in FIG. 1. The operational reliability of the conventional connecting structure is restricted by the allowable specific pressure of the alloy material of the bearing, the position of the oil groove on the friction surface, fitting process, micro-appearance of the friction surface, and flexure and deformation of the piston pin when bearing a force. In use, as the bushing is often revolved, the oil path is easy to block, and ablation or interlocking occurs on the friction surface of the bushing alloy due to oil shortage. Thus, the dysfunction of the bushing of the small end of the connecting rod is one of the most common dysfunctions in operation of the reciprocating internal combustion engine.

SUMMARY OF THE INVENTION

In view of the above-described problems, it is one objective of the invention to provide a connecting rod of an internal combustion engine comprising a flexible structure made of hard material. The invention is capable of improving the friction performance between the center hole and the piston pin without pressing a sliding bushing in the center hole of the connecting rod.

To achieve the above objective, in accordance with one embodiment of the invention, there is provided a connecting rod of an internal combustion engine comprising a small end and a shank. The small end employs a flexible structure made of hard material. The small end comprises a center hole. The hard material is a steel or alloy material having a tensile strength greater than or equal to 700 megapascal. The small end of the connecting rod matches with a piston pin. The flexible structure of the small end operates to allow an elastic deformation of the center hole along an axial direction thereof produced by cylinder pressure exerted on the piston pin to adapt to a bending deformation of the piston pin along the axial direction.

The small end of the flexible structure comprises a circular body and a flexible support. The circular body encircles the center hole, and the center hole is a complete circular hole having a constant diameter. The flexible support is formed by extending two tile-shaped supporting structures from two end surfaces of the circular body along the axial direction of the center hole, respectively. Each of the tile-shaped supporting structure is less than a semicircle and comprises an opening; the opening of the tile-shaped supporting structure backs on the shank. An inner arc surface of the tile-shaped supporting structure is an extension of an inner arc surface of the center hole.

In a class of this embodiment, the tile-shaped supporting structure is increasingly thin along the axial direction from an extension origin thereof to an outer end thereof.

In a class of this embodiment, two end surfaces of the circular body are in parallel with each other.

In a class of this embodiment, the two tile-shaped supporting structures are symmetrically arranged on the two ends of the circular body for well fitting the bending deformation of the piston pin along the axial direction during operation.

In a class of this embodiment, each of the tile-shaped supporting structure has a thickness of between 4 and 8 mm.

In a class of this embodiment, the tile-shaped supporting structure and the circular body are connected by a smooth connecting arc having a radius of between 10 and 30 mm.

In a class of this embodiment, a distance L1 between two outer end surfaces of the two tile-shaped supporting structures is between 1.5 and 2.5 times a distance L2 between two end surfaces of the circular body.

In a class of this embodiment, an arc-shaped oil groove is arranged along the axial direction on the inner arc surface of the center hole close to the shank.

Advantages of the invention are summarized as follows. The improvement of the invention is that a lower end of a stress surface of the center hole of the connecting rod adopts a local flexible structure rather than the conventional rigid structure. Specifically, the small end of the connecting rod employs the flexible structure made of a hard material, that is, the small end is made of steel or alloy material having a tensile strength of greater than or equal to 700 megapascal; the small end of the connecting rod matches with the piston pin; and the flexible structure of the small end operates to allow the elastic deformation of the center hole along the axial direction thereof produced by cylinder pressure exerted on the piston pin to adapt to the bending deformation of the piston pin along the axial direction. The elastic deformation and the bending deformation are shown in FIG. 6. Thus, hard contact points will not occur in micro-regions between friction surfaces, and interlocking phenomenon is prevented during the friction.

Particularly, the small end employs the special flexible structure. The circular body encircles the center hole being a circular hole having a constant diameter and two ends of the center hole is provided with tile-shaped supporting structure, so that the flexible structure allows the center hole to properly match with the piston pin whenever the center hole is deformed due to the press of the piston pin or is not deformed in an unstressed condition, or the piston pin is deformed subject to the duration and the variation of the stress state. That is, the proper match between the center hole and the piston pin is achieved in all working conditions, and the friction performance between the center hole and the piston pin is essentially improved.

Furthermore, two oil grooves are milled on two sides of the center hole, respectively, through the center hole. Two tile-shaped supporting structures are arranged on two ends of the small end, and each of the tile-shaped supporting structure is less than a semicircle and comprises an opening. The arrangement of the tile-shaped supporting structures operates to collect lubricant oil spattered from a crankcase of the engine and introduce the lubricant oil to the friction surface via the oil grooves. Parameters of the oil groove, such as an included angle between a vertical centerline of the center hole and a connecting line of a center of the oil groove and a center of the center hole, a depth H3 of the oil groove, and a wedge angle of the lubricant oil, can be adjusted, thereby effectively realizing the lubrication and dissipation, and preventing adhesion friction between the friction surface.

No bushing is required to be pressed in the center hole thereby preventing the oil path from being blocked due to the rotation of the bushing.

In summary, the connecting rod of the internal combustion engine comprising a flexible structure made of hard material has practical significance in improving the working reliability of the engine, simplifying the structure of the connecting rod, and saving the manufacturing cost.

DETAILED DESCRIPTION OF THE EMBODIMENTS

For further illustrating the invention, experiments detailing a connecting rod of an internal combustion engine compris-ing a flexible structure made of hard material are described hereinbelow combined with the drawings.

Figure 1:
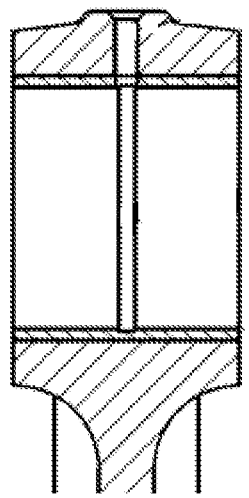
FIG. 1 is a structure diagram of a small end of a conventional connecting rod provided with a bushing.
Figure 2:
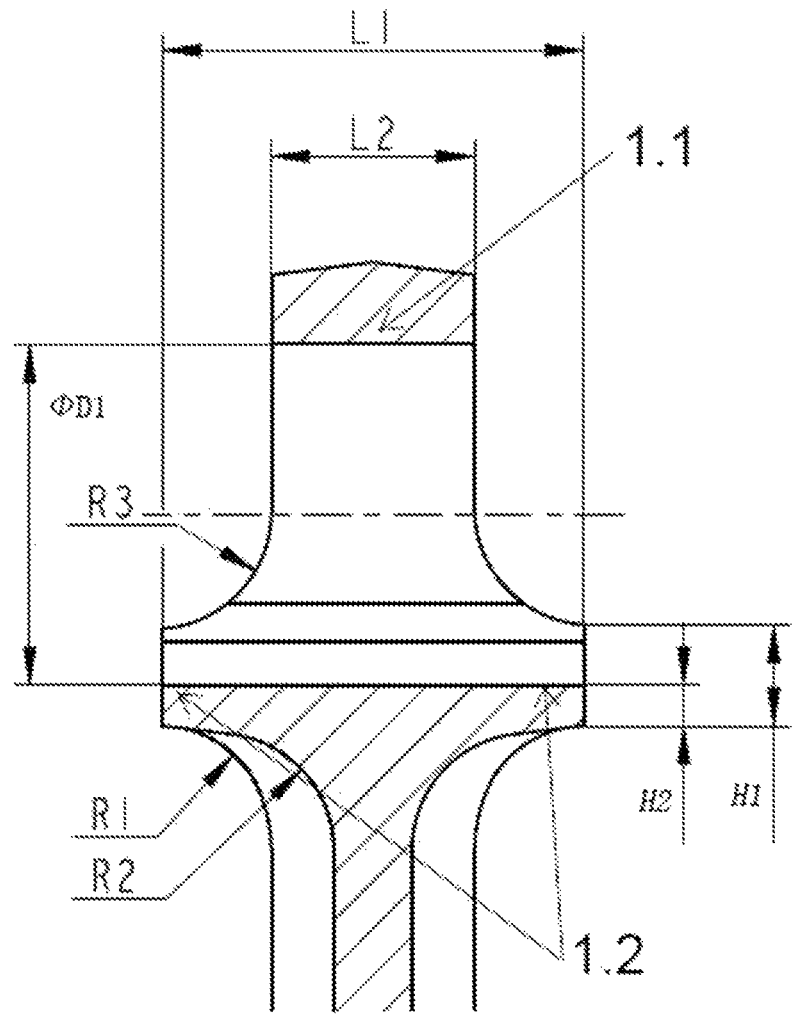
FIG. 2 is a cross sectional view of a small end of a connecting rod of the invention.
Figure 3:
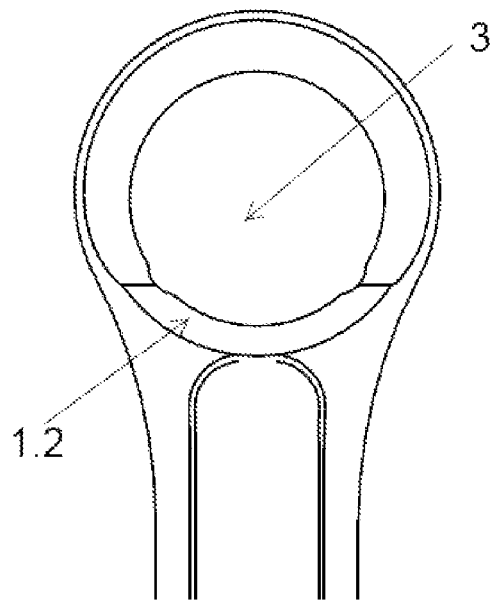
FIG. 3 is a left view of a small end of a connecting rod of FIG. 2.
Figure 4:
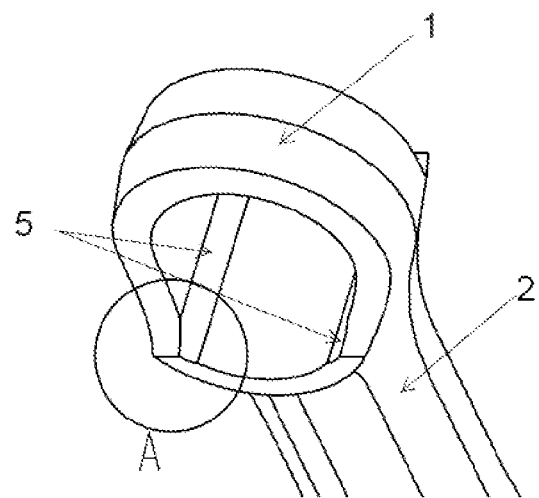
FIG. 4 is a stereogram of a small end of a connecting rod of the invention.
Figure 5:
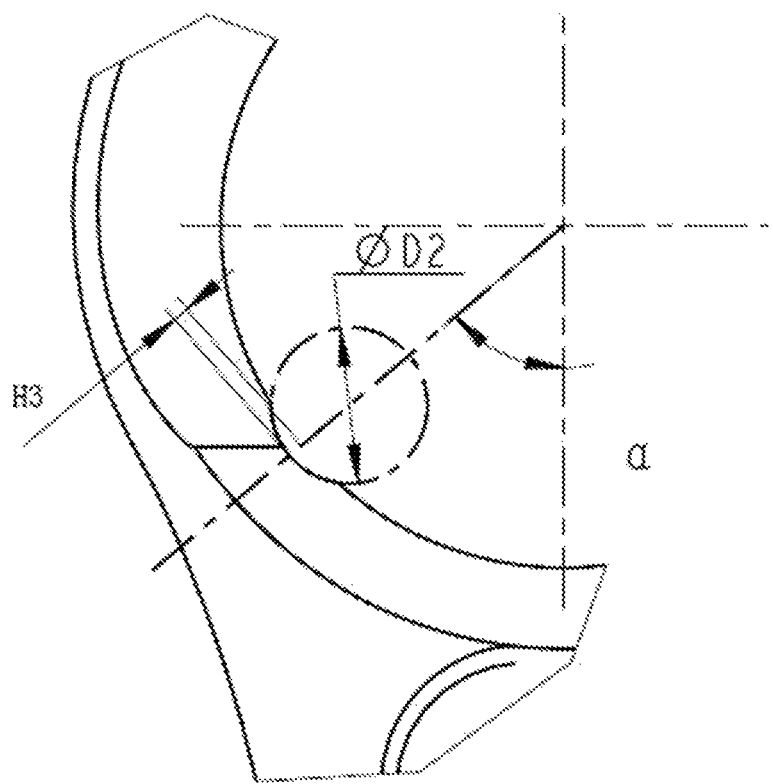
FIG. 5 is an enlarged view of part A in FIG. 4.
Figure 6:
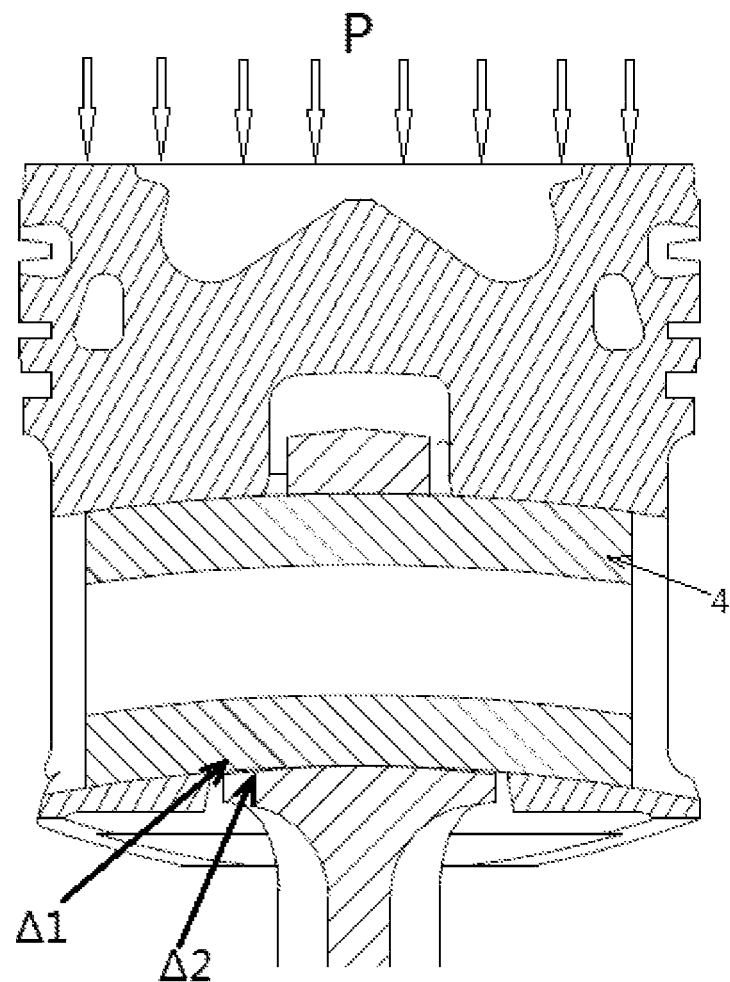
FIG. 6 is structure diagram showing an elastic deformation of a center hole fitting a bending deformation of a piston pin.

As shown in FIGS. 2, 3, and 4, a connecting rod of an internal combustion engine comprises a flexible structure made of hard material. The connecting rod comprises a small end 1 and a shank 2. The small end 1 comprises a center hole 3. The small end 1 of the connecting rod employs a flexible structure made of hard material. The small end 1 is made of steel or alloy material, such as 38MnVS6 and C70S6, which has a tensile strength σb greater than or equal to 700 megapascal.

The small end 1 of the connecting rod matches with a piston pin 4; and the flexible structure of the small end 1 operates to allow an elastic deformation Δ2 of the center hole 3 along an axial direction thereof produced by cylinder pressure exerted on the piston pin 4 to adapt to a bending deformation Δ1 of the piston pin 4 along the axial direction. The small end 1 of the flexible structure comprises a circular body 1.1 and a flexible support. The circular body 1.1 encircles the center hole 3 along the axial direction, and the center hole 3 is a complete circular hole having a constant diameter. The flexible support is formed by extending two tile-shaped supporting structures 1.2 from two end surfaces of the circular body 1.1 along an axial direction of the center hole 3, respectively. Each of the tile-shaped supporting structure 1.2 is less than a semicircle and comprises an opening; the opening of the tile-shaped supporting structure 1.2 backs on the shank 2. An inner arc surface of the tile-shaped supporting structure 1.2 is an extension of an inner arc surface of the center hole 3.

A thickness H2 of the tile-shaped supporting structure 1.2 is constant and between 4 and 8 mm, or is variable, that is, the thickness of the tile-shaped supporting structure 1.2 is increasingly thin along the axial direction from an extension origin thereof to an outer end thereof. The tile-shaped supporting structure 1.2 and the circular body 1.1 are connected by a smooth connecting arc having a radius R3 of between 10 and 30 mm. A distance L1 between two outer end surfaces of the two tile-shaped supporting structures is between 1.5 and 2.5 times a distance L2 between two end surfaces of the circular body 1.1. In this example, the thickness of the tile-shaped supporting structure 1.2 is increasingly thin along the axial direction from an extension origin thereof to an outer end thereof.

Two arc-shaped grooves 5 are arranged along the axial direction on two sides of the inner arc surface of the center hole 3 close to the shank 2; and each of the arc-shaped grooves 5 has a diameter ΦD2 of between 10 and 30 mm and a depth H3 of between 0.1 and 0.3 mm.

The connecting rod employs a local flexible structure to substitute the rigid structure of the lower small end in the conventional reciprocating internal combustion engine. Specifically, parameters of the invention are adjusted to adjust the rigidity of the junction between the shank and the small end of the connecting rod thereby being more flexible than the conventional connecting rod and realizing the purpose of the flexible structure, and to allow the elastic deformation Δ2 of the center hole 3 along the axial direction thereof produced by cylinder pressure exerted on the piston pin 4 to adapt to the bending deformation Δ1 of the piston pin 4 along the axial direction. Thus, hard contact points on friction surfaces and interlocking phenomenon are avoided. Adjustable parameters comprise: L1, L2, R1, R2, R3, and H2, in which, L1 represents the distance between the two outer end surfaces of the two tile-shaped supporting structures, L2 represents the distance between two end surfaces of the circular body 1.1, R1 represents a radius of a transitional connecting arc between a stiffener of the shank 2 and the tile-shaped supporting structure, R2 represents a radius of a transitional connecting arc between the shank body and the tile-shaped supporting structure, R3 represents a transitional connecting arc between the title-shaped supporting structure and the circular body 1.1, and H2 represents the thickness of the tile-shaped supporting structure.

As shown in FIG. 4, the two oil grooves 5 are milled on two sides of the center hole, respectively, through the center hole 3. The two tile-shaped supporting structures 1.2 are arranged on two ends of the small end, and each of the tile-shaped supporting structure 1.2 is less than a semicircle and comprises an opening. The arrangement of the tile-shaped supporting structures 1.2 operates to collect lubricant oil spattered from the crankcase of the engine and introduce the lubricant oil to the friction surface via the oil grooves 5. Parameters of the oil groove, such as an included angle $\alpha$ between a vertical centerline of the center hole and a connecting line of a center of the oil groove 5 and a center of the center hole, a depth H3 of the oil groove, and a wedge angle of the lubricant oil, can be adjusted, thereby effectively realizing the lubrication and dissipation, and preventing adhesion friction between the friction surface.

In this example, the connecting rod of the internal combustion engine based on the hard material and the flexible structure has the following parameters: L1=44 mm, L2=23 mm, R1=8 mm, R2=15 mm, R3=20 mm, H1=13.65 mm, H2=5.9 mm, H3=0.15 mm, ΦD1=44 mm, ΦD2=25 mm, and $\alpha$=50°. ΦD1 is a diameter of the center hole of the connecting rod. The small end of the connecting rod deforms to cooperate with the piston pin for preventing interlocking phenomenon. The connecting rod has passed a series of engine tests. After 1000 h of stability test of the engine, no abnormal abrasion occurs in the center hole, and a maximum abraded quantity in radical direction of the center hole after the test is 0.005 mm, and no deformation occurs along the axial direction of the center hole.

Although particular embodiments of the invention have been shown and described, it will be obvious to those skilled in the art to adopt other flexible structure on the small end 1 of the connecting rod for allowing the elastic deformation Δ2 of the center hole 3 along the axial direction produced by the press of the cylinder via the piston pin 4 to adapt to the bending deformation Δ1 of the piston pin 4 along the axial direction. Therefore, these changes fall within the protection scope of the present invention restricted in the claim.

The invention claimed is:

1. A connecting rod of an internal combustion engine, the connecting rod comprising a small end and a shank, the small end employing a flexible structure made of hard material and comprising a circular body, a center hole, and a flexible support;

wherein:
the hard material is a steel or alloy material having a tensile strength greater than or equal to 700 megapascal;
the circular body encircles the center hole, and the center hole is a complete circular hole having a constant diameter;
the flexible support is formed by extending two tile-shaped supporting structures from two end surfaces of the circular body along an axial direction of the center hole, respectively;
each of the two tile-shaped supporting structures is less than a semicircle and comprises an opening;
the opening of each of the two tile-shaped supporting structures backs on the shank;
an inner arc surface of each of the two tile-shaped supporting structures is an extension of an inner arc surface of the center hole;
the small end matches with a piston pin;
the flexible structure of the small end operates to allow an elastic deformation of the center hole along the axial direction thereof produced by a cylinder pressure exerted on the piston pin to adapt to a bending deformation of the piston pin along the axial direction; and
each of the two tile-shaped supporting structures has a thickness of between 4 and 8 mm.

2. The connecting rod of claim 1, wherein each of the two tile-shaped supporting structures is increasingly thin along the axial direction from an extension origin thereof to an outer end thereof.

3. The connecting rod of claim 1, wherein the two end surfaces of the circular body are in parallel with each other.

4. The connecting rod of claim 1, wherein the two tile-shaped supporting structures are symmetrically arranged on the two end surfaces of the circular body.

5. The connecting rod of claim 1, wherein the small end of the connecting rod is made of the hard material 38MnVS6 or C70S6.

6. The connecting rod of claim 1, wherein the two tile-shaped supporting structures and the circular body are connected by a connecting arc having a radius of between 10 and 30 mm.

7. The connecting rod of claim 1, wherein a distance between two outer end surfaces of the two tile-shaped supporting structures is between 1.5 and 2.5 times a distance between the two end surfaces of the circular body.

8. The connecting rod of claim 1, wherein
an arc-shaped oil groove is arranged along the axial direction on the inner arc surface of the center hole close to the shank; and
the arc-shaped oil groove has a diameter of between 10 and 30 mm and a depth of between 0.1 and 0.3 mm.

9. A connecting rod of an internal combustion engine, the connecting rod comprising a small end and a shank, the small end employing a flexible structure made of hard material and comprising a circular body, a center hole, and a flexible support;
wherein:
the hard material is a steel or alloy material having a tensile strength greater than or equal to 700 megapascal;
the circular body encircles the center hole, and the center hole is a complete circular hole having a constant diameter;
the flexible support is formed by extending two tile-shaped supporting structures from two end surfaces of the circular body along an axial direction of the center hole, respectively;
each of the two tile-shaped supporting structures is less than a semicircle and comprises an opening;
the opening of each of the two tile-shaped supporting structures backs on the shank;
an inner arc surface of each of the two tile-shaped supporting structures is an extension of an inner arc surface of the center hole;
the small end matches with a piston pin;
the flexible structure of the small end operates to allow an elastic deformation of the center hole along the axial direction thereof produced by a cylinder pressure exerted on the piston pin to adapt to a bending deformation of the piston pin along the axial direction; and the two tile-shaped supporting structures and the circular body are connected by a smooth connecting arc having a radius of between 10 and 30 mm.

10. A connecting rod of an internal combustion engine, the connecting rod comprising a small end and a shank, the small end employing a flexible structure made of hard material and comprising a circular body, a center hole, and a flexible support;

wherein:

the hard material is a steel or alloy material having a tensile strength greater than or equal to 700 megapascal;

the circular body encircles the center hole, and the center hole is a complete circular hole having a constant diameter;

the flexible support is formed by extending two tile-shaped supporting structures from two end surfaces of the circular body along an axial direction of the center hole, respectively;

each of the two tile-shaped supporting structures is less than a semicircle and comprises an opening;

the opening of each of the two tile-shaped supporting structures backs on the shank;

an inner arc surface of each of the two tile-shaped supporting structures is an extension of an inner arc surface of the center hole;

the small end matches with a piston pin;

the flexible structure of the small end operates to allow an elastic deformation of the center hole along the axial direction thereof produced by a cylinder pressure exerted on the piston pin to adapt to a bending deformation of the piston pin along the axial direction; and a distance between two outer end surfaces of the two tile-shaped supporting structures is between 1.5 and 2.5 times a distance between the two end surfaces of the circular body.

11. A connecting rod of an internal combustion engine, the connecting rod comprising a small end and a shank, the small end employing a flexible structure made of hard material and comprising a circular body, a center hole, and a flexible support;

wherein:

the hard material is a steel or alloy material having a tensile strength greater than or equal to 700 megapascal;

the circular body encircles the center hole, and the center hole is a complete circular hole having a constant diameter;

the flexible support is formed by extending two tile-shaped supporting structures from two end surfaces of the circular body along an axial direction of the center hole, respectively;

each of the two tile-shaped supporting structures is less than a semicircle and comprises an opening;

the opening of each of the two tile-shaped supporting structures backs on the shank;

an inner arc surface of each of the two tile-shaped supporting structures is an extension of an inner arc surface of the center hole;

the small end matches with a piston pin;

the flexible structure of the small end operates to allow an elastic deformation of the center hole along the axial direction thereof produced by a cylinder pressure exerted on the piston pin to adapt to a bending deformation of the piston pin along the axial direction;

an arc-shaped oil groove is arranged along the axial direction on the inner arc surface of the center hole close to the shank; and the arc-shaped oil groove has a diameter of between 10 and 30 mm and a depth of between 0.1 and 0.3 mm.

\* \* \* \* \*